United States Patent
Osborne et al.

(10) Patent No.: US 7,588,629 B2
(45) Date of Patent: Sep. 15, 2009

(54) FILTER CASSETTE

(75) Inventors: Mike Osborne, Louisville, KY (US); Keiron O'Connell, Louisville, KY (US); Husheder P. Daruwalla, Dunwoody, GA (US); Joachim Horst Wenzek, Amstelveen (NL); Ng Cheah Wei, Selangor (MY)

(73) Assignee: AAF-McQuay Inc., Louisville, KY (US)

( * ) Notice: Subject to any disclaimer, the term of this patent is extended or adjusted under 35 U.S.C. 154(b) by 480 days.

(21) Appl. No.: 11/336,105

(22) Filed: Jan. 20, 2006

(65) Prior Publication Data

US 2007/0169448 A1   Jul. 26, 2007

(51) Int. Cl.
  *B01D 53/02* (2006.01)
(52) U.S. Cl. .............................. 96/129; 55/482; 55/484; 55/502; 55/512; 55/516; 96/134; 96/136; 96/138
(58) Field of Classification Search ................... 55/484, 55/DIG. 31, 501, 482, 502, 511–519; 96/129, 96/136, 138, 151
See application file for complete search history.

(56) References Cited

U.S. PATENT DOCUMENTS

| | | | | |
|---|---|---|---|---|
| 3,243,942 A | * | 4/1966 | Burke | 96/129 |
| 3,344,590 A | * | 10/1967 | Smith et al. | 55/484 |
| 3,354,623 A | * | 11/1967 | Keller | 55/484 |
| 3,380,810 A | * | 4/1968 | Hamblin | 422/176 |
| 3,576,095 A | * | 4/1971 | Rivers | 55/484 |
| 3,873,287 A | | 3/1975 | Barnebey | |
| 3,969,095 A | * | 7/1976 | Kurahashi | 96/133 |
| 4,204,846 A | * | 5/1980 | Brenholt | 96/425 |
| 4,216,003 A | | 8/1980 | Diachuk | |
| 4,969,936 A | | 11/1990 | Schweigert et al. | |
| 5,080,699 A | | 1/1992 | Ho et al. | |
| 5,223,011 A | * | 6/1993 | Hanni | 55/484 |
| 5,512,074 A | * | 4/1996 | Hanni et al. | 55/484 |
| 5,554,203 A | * | 9/1996 | Borkent et al. | 55/378 |
| 5,733,350 A | | 3/1998 | Muller et al. | |
| 5,964,927 A | * | 10/1999 | Graham et al. | 96/121 |
| 6,007,595 A | * | 12/1999 | Baik et al. | 55/385.2 |
| 6,045,597 A | * | 4/2000 | Choi | 55/483 |
| 6,113,674 A | * | 9/2000 | Graham et al. | 95/148 |
| 6,183,528 B1 | * | 2/2001 | Jeanseau et al. | 55/385.2 |
| 6,447,566 B1 | * | 9/2002 | Rivera et al. | 55/482 |
| 6,451,079 B1 | * | 9/2002 | Lange et al. | 55/379 |
| 6,482,247 B2 | * | 11/2002 | Jaroszczyk et al. | 55/484 |
| 6,485,538 B1 | * | 11/2002 | Toyoshima | 55/490 |
| 6,533,847 B2 | * | 3/2003 | Seguin et al. | 96/129 |

(Continued)

*Primary Examiner*—Duane Smith
*Assistant Examiner*—Dung Bui
(74) *Attorney, Agent, or Firm*—John F. Salazar; Middleton Reutlinger

(57) ABSTRACT

A filter cassette having opposing rectangular side panels with at least one pair of filter media containers there between wherein each filter media container has a pair of opposing rectangular end plates and a pair of opposing rectangular media screens, each pair of containers are in a "V" configuration with adjacent end plates having a unitary configuration and at least one media fill aperture for each media container on a non-sealing side of the filter cassette, outermost end plates on a sealing side of the filter cassettes extend between corners of opposing side panels forming a substantially smooth sealing surface, and a fill cap is attached to each unitary pair of end plates having media fill apertures enclosing the media fill apertures.

26 Claims, 16 Drawing Sheets

U.S. PATENT DOCUMENTS

| | | | |
|---|---|---|---|
| 6,802,880 B1 * | 10/2004 | Wijaya | 55/385.3 |
| 6,860,916 B2 * | 3/2005 | Kubokawa et al. | 55/495 |
| 6,955,696 B1 * | 10/2005 | Ost et al. | 55/357 |
| 7,309,369 B2 * | 12/2007 | Eder | 55/495 |
| 7,410,520 B2 * | 8/2008 | Nowak et al. | 55/482 |
| 2003/0159586 A1 * | 8/2003 | Seguin et al. | 96/129 |
| 2003/0230062 A1 * | 12/2003 | Kubokawa et al. | 55/497 |
| 2004/0144254 A1 * | 7/2004 | Wiser et al. | 96/66 |
| 2007/0075028 A1 * | 4/2007 | Nagel et al. | 211/59.2 |
| 2008/0034974 A1 * | 2/2008 | Uemura et al. | 96/136 |

* cited by examiner

FILTER CASSETTE

CROSS-REFERENCE TO RELATED APPLICATION

Not applicable.

STATEMENT REGARDING FEDERALLY SPONSORED RESEARCH OR DEVELOPMENT

Not applicable.

FIELD OF INVENTION

The present invention relates to filters, such as gas or air filters, utilizing a solid filtration media for dry-scrubbing, adsorbing, absorbing, or reacting with at least one selected component in a gas stream wherein the filtration media is contained in a cassette.

BACKGROUND OF THE INVENTION

It is known in the filtration arts to provide solid filtration media for gas or air filtration. Media used in the filtration of gases are typically in the form of pellets confined in a container forming a filtration bed through which the gas stream to be filtered is passed. Filtration of selected components in the gas stream may be accomplished by several different mechanisms such as by adsorption or absorption with the filtration media. Filtration may also be accomplished by a variety of other means such as a chemical reaction between the selected component(s) and the filtration media or even by physically trapping the component(s) within the filtration media.

The means to contact the gas stream with the filtration media typically involves placing the filtration media in a container to form a bed of filtration media through which a gas stream is passed. These containers typically have perforations or slots in a front and rear wall and four side walls and may have additional structural features forming a cassette holding the container which holds a defined depth of filtration media. The gas enters the front or rear wall, passes through the filtration media, and exits the other of the front or rear wall. The residence time of the gas in the filtration media is dependent upon the volumetric flow rate of the gas, the size and shape of the pellets forming the filtration media bed and void space therein, the depth of the bed as well as the configuration and orientation of the filter bed or cassette.

An example of a known filtration container is a flat box configuration having perforations in large planar walls spaced apart by four side walls. The spacing between the large planar walls may be as little as an inch, depending on desired residence time. The container is filled with filtration media by pouring into an opening in a side wall. The container is then typically placed within the cross-section of a duct or within a rack or frame through which the gas to be filtered is passed. A problem encountered with this configuration is that the pressure placed on the container is normal to the face of the container and causes bowing of the large planar walls which in turn subjects the filtration media to frictional forces releasing a portion thereof into the gas stream. Another problem encountered with this configuration is that the residence time of the gas within the filtration bed is relatively short since the flow of gas is normal to the filter.

Cassette configurations have been used to overcome some of the problems associated with the normal flow containers. One such design involves placing the filter container with a cassette at an angle with the direction of gas flow. This configuration reduces the bow of the container and provides for an increased residence time of the gas within the filter. Another design has been to place two containers in a "V" configuration within a cassette. However, many of these containers and cassettes have failed to provide the efficient and reliable filtration capability that is often times required.

SUMMARY OF THE INVENTION

The filter cassette of the present invention provides a cassette for holding solid filtration media in at least two beds for the filtration of at least component from a gas stream. Generally, the present invention provides a cassette for solid filtration media, formed preferably from a polymeric material and having at least one pair of media containers in a "V" configuration. The polymeric material is of a type providing the filter cassette with a rigid or semi-rigid structure. The component parts of the filter cassette have a snap together configuration eliminating the need for adhesives which may introduce contaminates into the gas stream. The containers include opposing end plates and a pair of substantially parallel media screens interposing two side panels forming a rectangular filter bed. The openings in the media screens are sized and shaped to allow efficient flow through of gases, but not permitting the flow through of the solid filtration media contained therein. There are several embodiments of the filter cassette of the present invention and several alternative component parts thereof described in the present application.

One embodiment of the filter cassette has rectangular side panels with a pair of filter media containers extending there between in a "V" configuration. Each filter media container is formed with opposing rectangular end plates and a pair of opposing rectangular media screens. Outermost end plates on a sealing side of the cassette extend between corners of the side panels forming a substantially smooth, flat and substantially uniform sealing surface. The sealing end plates and mated side panel edges optionally have a seal extending between the outer edges of side panels where the seal may be a distinctive profile seal such as a butterfly seal of the present invention having two longitudinally extending flaps in a "V" configuration. These seals on a sealing surface of the filter cassette provides for a sealing fit of the filter cassette in a variety of housings or racks. Friction reducers may be placed on outer edges of end plates and/or edges of side panels providing for the reduction of friction between the cassette and housing or rack allowing for easier installation and removal. Guide notches in the side edges of side panels are provided to cooperate with guides in housing. Side panels optionally have gasket locator lines in strip form extending between the outer edges of the side panels wherein a gasket, such as a compression gasket, is placed therein. These gaskets form seals between side panels of adjacent cassettes when a plurality of cassettes are placed in a rack or housing. The side panels may have finger holes with notches, proximate and circumscribing a portion of the finger holes, proximate corners of the filter cassette providing for easier gripping of the cassette for placing into and removing from a track or housing. Additionally, the end plates may have rounded outer longitudinal corners decreasing a pressure drop across the filter cassette. Other embodiments include a variety of thickness of filtration beds, cassette sizes, and numbers of pairs of media containers within the cassettes. The media screens have apertures sized and configured to optimize media retention within and fluid flow there through and optionally have tapered apertures with the wider side of the aperture facing a gas inlet side. The media screens may also have supports increasing the ability of the media screens to resist deformation upon the application of pressure thereon. These supports may be in the form of ribs integral with the media screens between selected rows and columns of apertures and/or cross braces extending between pairs of opposing media screens.

Other features of the present invention will become apparent upon reviewing the following detailed description of preferred embodiments of the invention, in conjunction with the drawings and the appended claims.

BREIF DESCRIPTION OF THE DRAWINGS

Reference to the figures discloses several embodiments of the present invention and are not to be interpreted as limiting the scope of the present invention.

DETAILED DESCRIPTION OF THE PREFERRED EMBODIMENTS

The following detailed description is given primarily for clearness of understanding and no unnecessary limitations are to be understood there from and modifications will become obvious to those skilled in the art upon reading the disclosure and may be made without departing from the spirit of the invention and scope of the appended claims.

Figure 1:
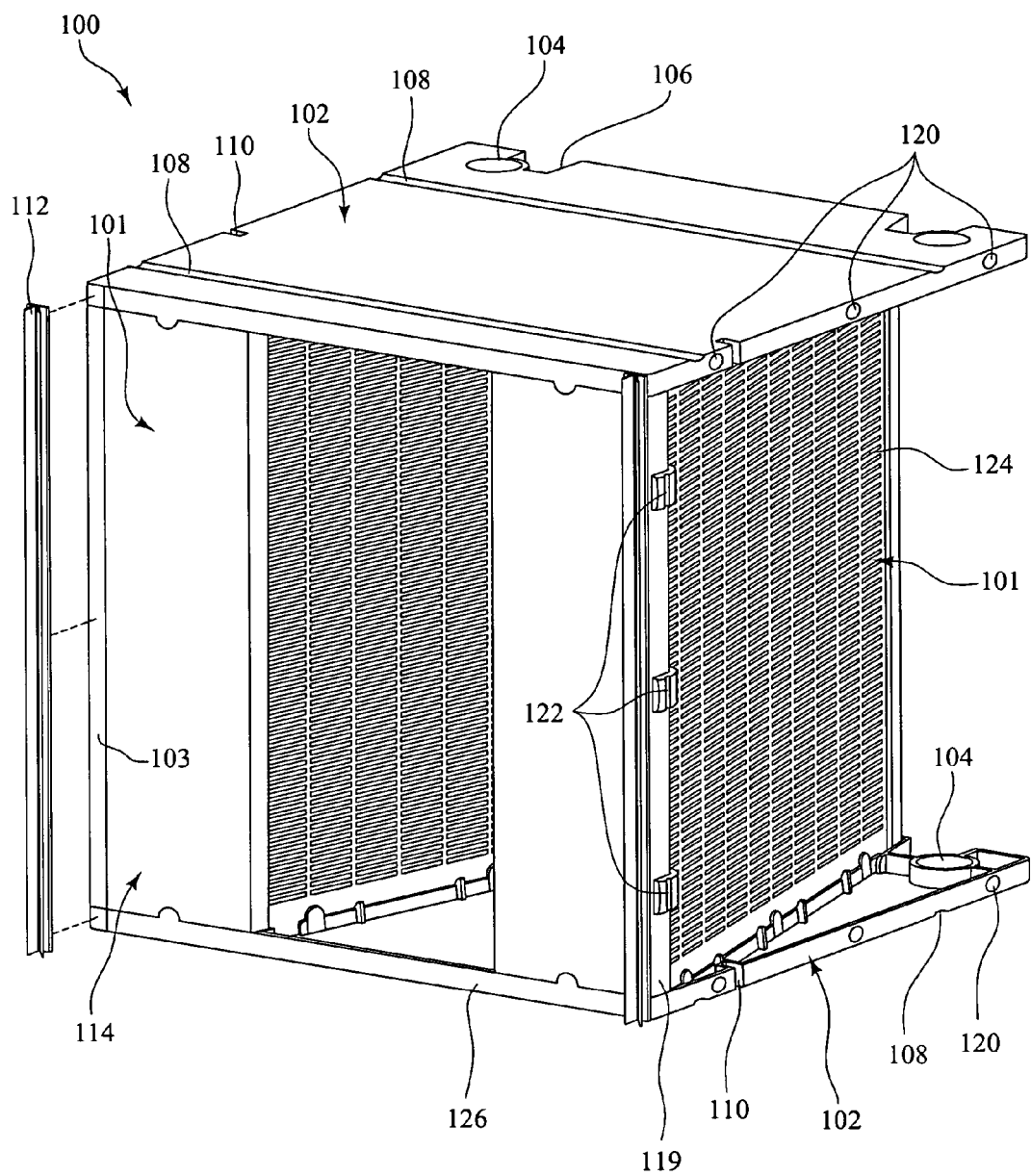
FIG. 1 is a perspective view of a filter cassette of the present invention showing a sealing side.

Shown in FIG. 1 is a perspective view of filter cassette 100. Filter cassette 100 has rectangular side panels 102 with a pair of filter media containers 101 extending there between. Each filter media container 101 is formed with opposing rectangular end plates 114 and 132 (shown in FIG. 2) and a pair of opposing rectangular media screens 124. The pair of filter media containers 101 are in a "V" configuration with outermost end plates 114 on a sealing side of cassette 100 extending between corners of side panels 102. The sealing side of filter cassette 100 is substantially smooth, flat and substantially uniform surface and is formed with end plates 114 and sealing edges 126 of side panels 102. End plates 114 and side panel edges 126 optionally have an indentation 103 extending between the outer edges of side panels 102 and are preferably substantially parallel and proximate the outer longitudinal edges of end plates 114. Seal location indentations 103 may have a seal 112 inserted therein. Seal 112 preferably will be a distinctive profile seal such as a butterfly seal (shown in FIG. 9) or a gel seal. Friction reducers 122 on outer edges 119 of end plates 114 are optional and are shown here in the form of a clip having a grove on an outer surface substantially perpendicular to rectangular side panels 102 which engage a guide in a housing or rack. Guide notches 110 in the side edges of side panels 102 are in the sides other than the sealing and non-sealing sides having end plates 114 and 132 respectively. Guide notches 110 are more proximate the sealing side than the non-sealing side of cassette 100 and are substantially equidistant from the sealing side. Preferably, outer side panels have substantially smooth outer surfaces void of holes proximate and between media container 101. Side panels 102 optionally have at least one gasket locator line 108 therein in strip form extending between the outer edges of side panels 102 substantially parallel the sealing surface of cassette 100. Preferably a gasket such as a compression gasket is in each gasket locator line 108. Optionally, rectangular side panels 102 each have at least one friction reducer 120 in the sides other than the sealing and said non-sealing sides. In the embodiment shown, side panel friction reducers 120 are in the form of a fastener having a low friction head adjacent the outer edges of side panels 102. In the embodiment shown, side panels 102 each have finger holes 104 proximate corners adjacent the non-sealing side of cassette 100. Also shown here are notches 106 in side panels 102 proximate and circumscribing a portion of finger holes 104. Finger holes 104 and notches 106 provide for easier gripping of cassette 100 for placing into and removing from a track or housing. Advantageously, end plates 114 and 132 have rounded outer longitudinal corners which aid in decreasing a pressure drop across filter cassette 100.

Figure 2:
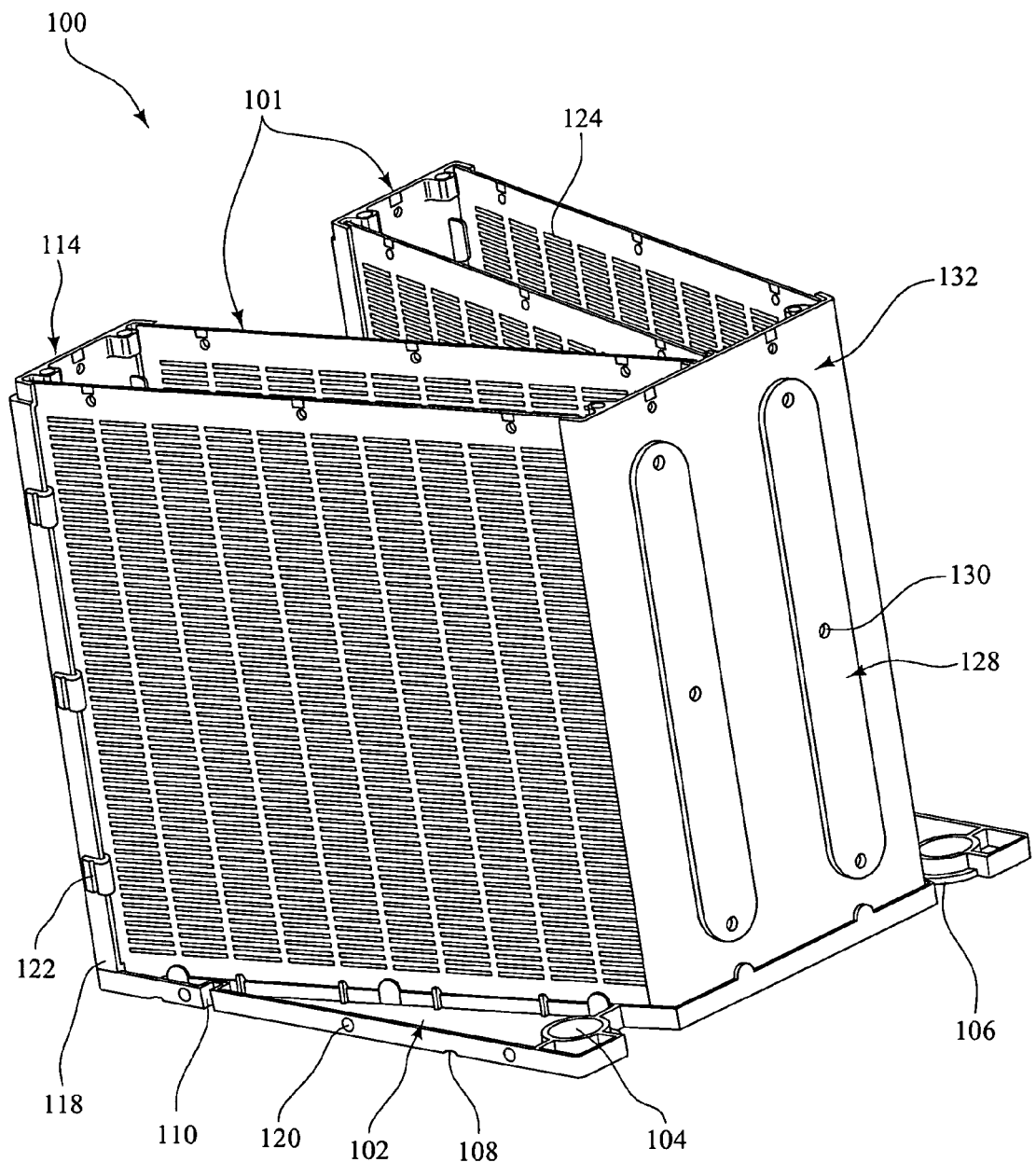
FIG. 2 is a perspective view of the filter cassette of FIG. 1 showing the non-sealing side.

FIG. 2 is a perspective view of the filter cassette 100 showing the non-sealing side and having a top side panel 102 removed. Shown here is rectangular end plate 132 having a unitary design providing an end plate for both filter media containers 101. Adjacent end plates of filter media containers are unitary and substantially planar in the form of a unitary double end plate 132 and media screens 124 of proximate containers 101 joined thereon with proximate media screens 101 being adjacent thereon. Unitary double end plate 132 provides each filter media container 101 with a media fill aperture, shown enclosed with a fill cap 128 here, on the non-sealing side of filter cassette 100 which is opposite the sealing side of said filter cassette 100. Fill caps 128 are attached to end plate 132 with fasteners 130 such as rivets through aligning holes in end plate 132 and fill caps 128. Also shown here is the internal snap together design between component parts forming filter cassette 100 providing a filter cassette without the gaseous contaminates that are generated with many adhesives.

Figure 3:
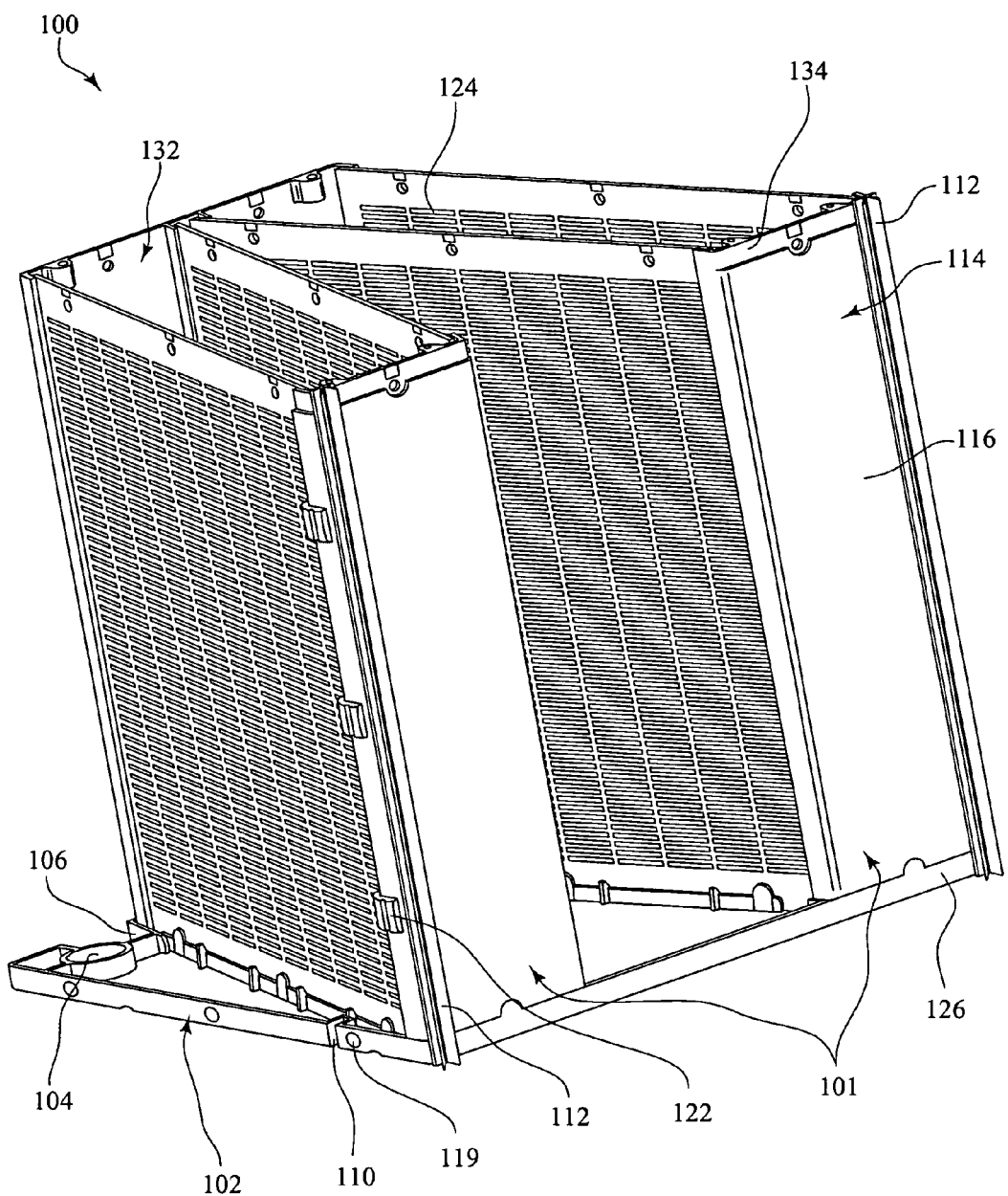
FIG. 3 is a perspective view of the filter cassette of FIG. 1 having a side panel removed showing the sealing side and internal relationship of component parts.

FIG. 3 is a perspective view of the filter cassette 100 having a side panel 102 removed showing the sealing side and internal relationship of component parts of filter cassette 100. Shown here are faces 116 of end plates 114 of media containers 101 forming a substantially smooth sealing surface with sealing edges 126 of side panels 102. End plates 114 have depending side edges 118 forming a part of a clip retainer for media screens 124. Faces 116 and depending side edges 118 form rounded outer corners which decreases a pressure drop across filter cassette 100. End plates 114 and side panel edges 126 optionally have seal 112 extending between the outer edges of side panels 102 and are preferably substantially parallel and proximate the outer longitudinal edges of end plates 114. Seal 112 preferably will be a distinctive profile seal such as a butterfly seal or optionally a gel seal. Friction reducers 122 on outer edges 119 of end plates 114 are shown in the form of a clip having a grove on an outer surface.

Figure 4:
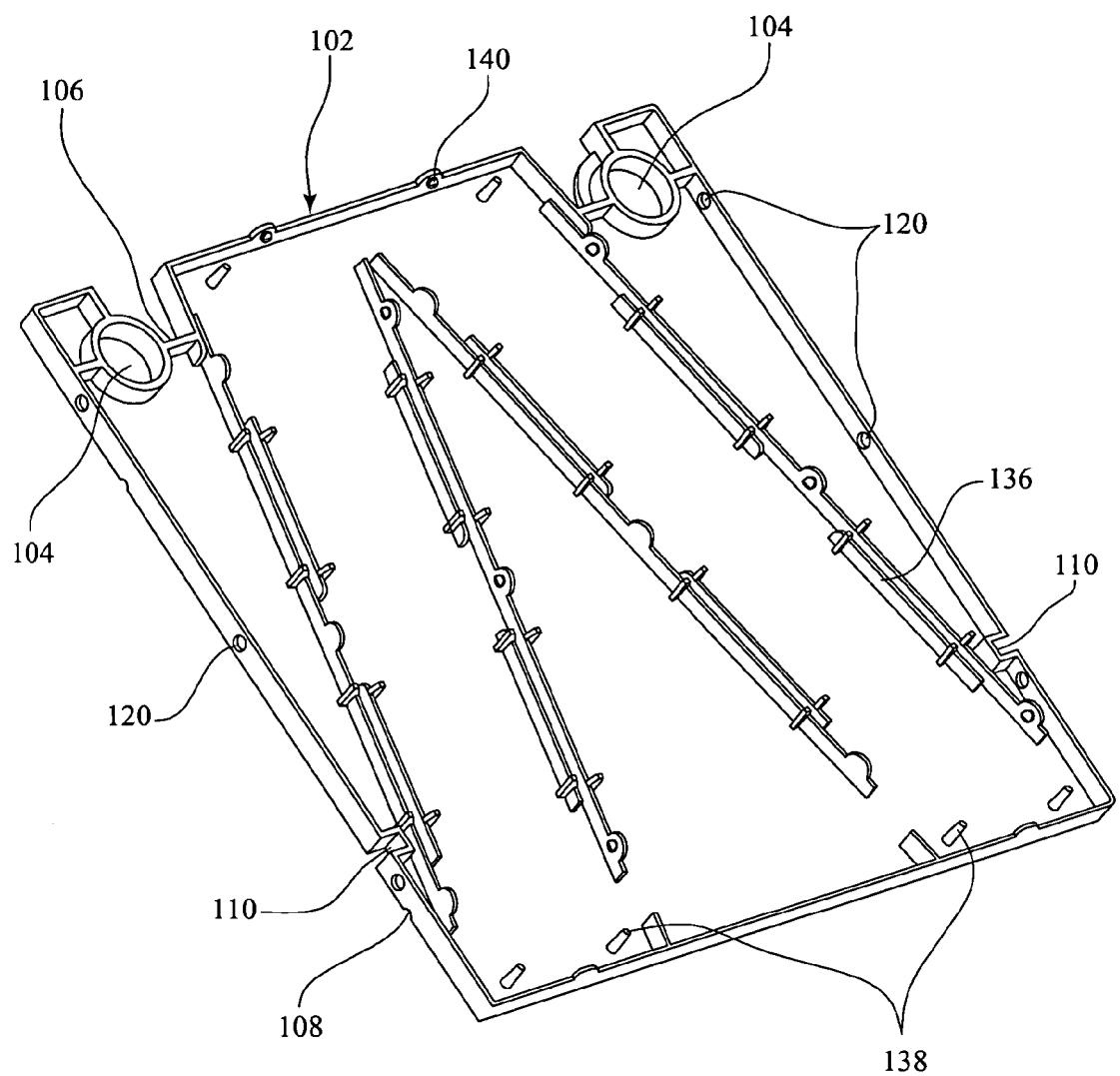
FIG. 4 is a perspective view of a side panel of the filter cassette of FIG. 1 showing the interlocking structure.

FIG. 4 shows the internal surface and side edges of side panels 102 of the filter cassette 100. The internal surface of side panels 102 have an interlocking structure with raised media screen snap retainers 136, guide posts 138 and dimples 140 for engaging end plates 114 and 132. Also shown are notches 106 in side panels 102 proximate and circumscribing a portion of finger holes 104, providing a means for easier gripping of cassette 100 for placing into and removing from a track or housing. Optional friction reducers 120 are shown in the sides other than the sealing and said non-sealing sides of rectangular side panel 102. In the embodiment shown, side panel friction reducers 120 in the form of fasteners having a low friction head adjacent the outer edges of side panels 102.

Figure 5:
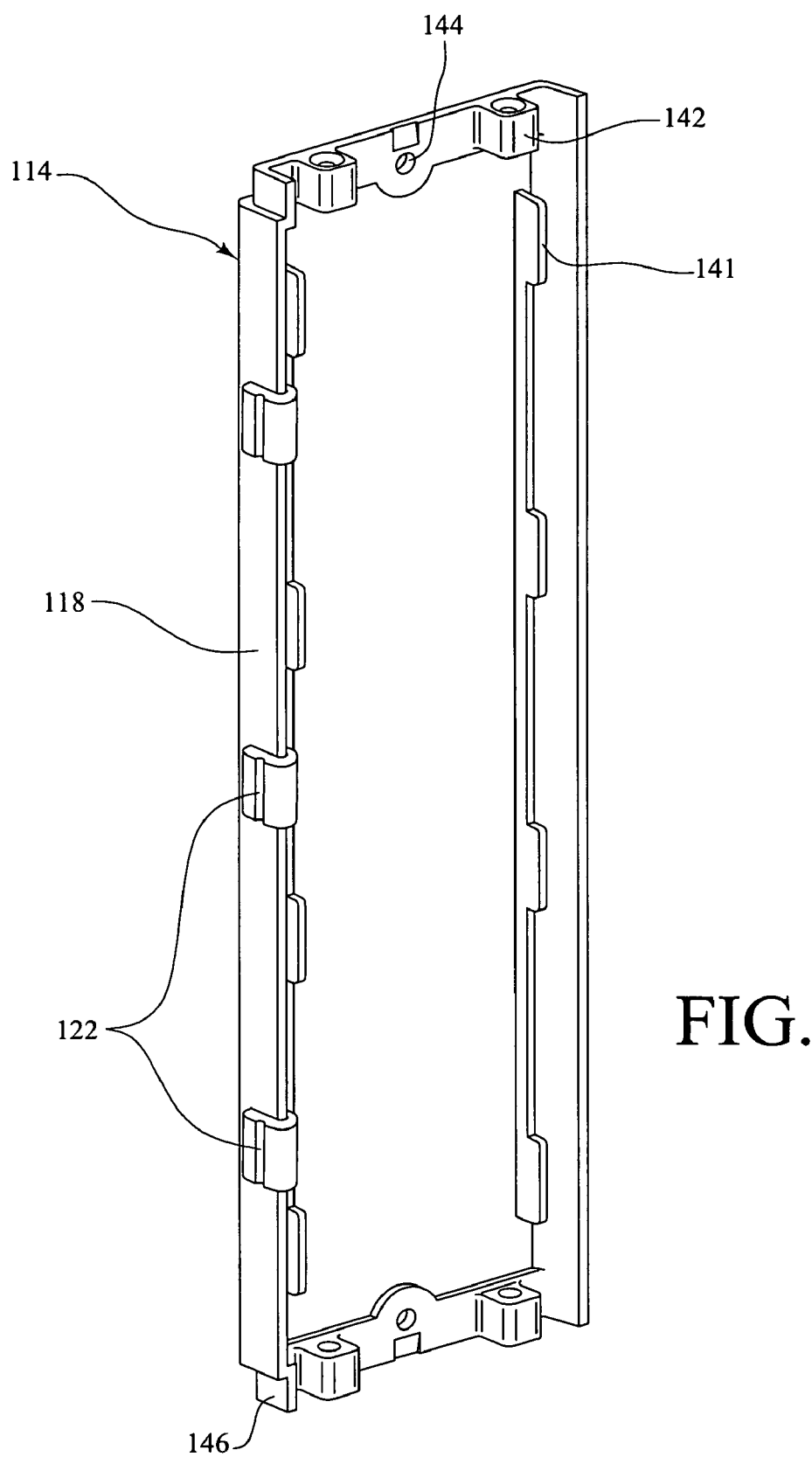
FIG. 5 is a perspective view of a sealing side end plate of the filter cassette of FIG. 1 showing the interlocking structure.

FIG. 5 shows an inner side of sealing side end plate 114 having an interlocking structure. Raised media snap retainers 141 engage an inner surface of media screen 124 while depending side edges 118 engage an outer surface of media screen 124. Friction reducers 122 on outer edges 119 of end plates 114 are shown as clips engaging side edges 118. Holes 144 engage dimples 140 on side panels 102. Female retainers 142 engage retaining posts 138 on side panel 102. This interlocking structure provides for a filter cassette without the need for adhesives. End plate 114 has rounded outer longitudinal corners and a recessed outer surface 146 adjacent longitudinal ends. Recessed outer surface 146 provides for a smooth outer surface with side panel edges 126 forming a sealing surface.

Figure 6:
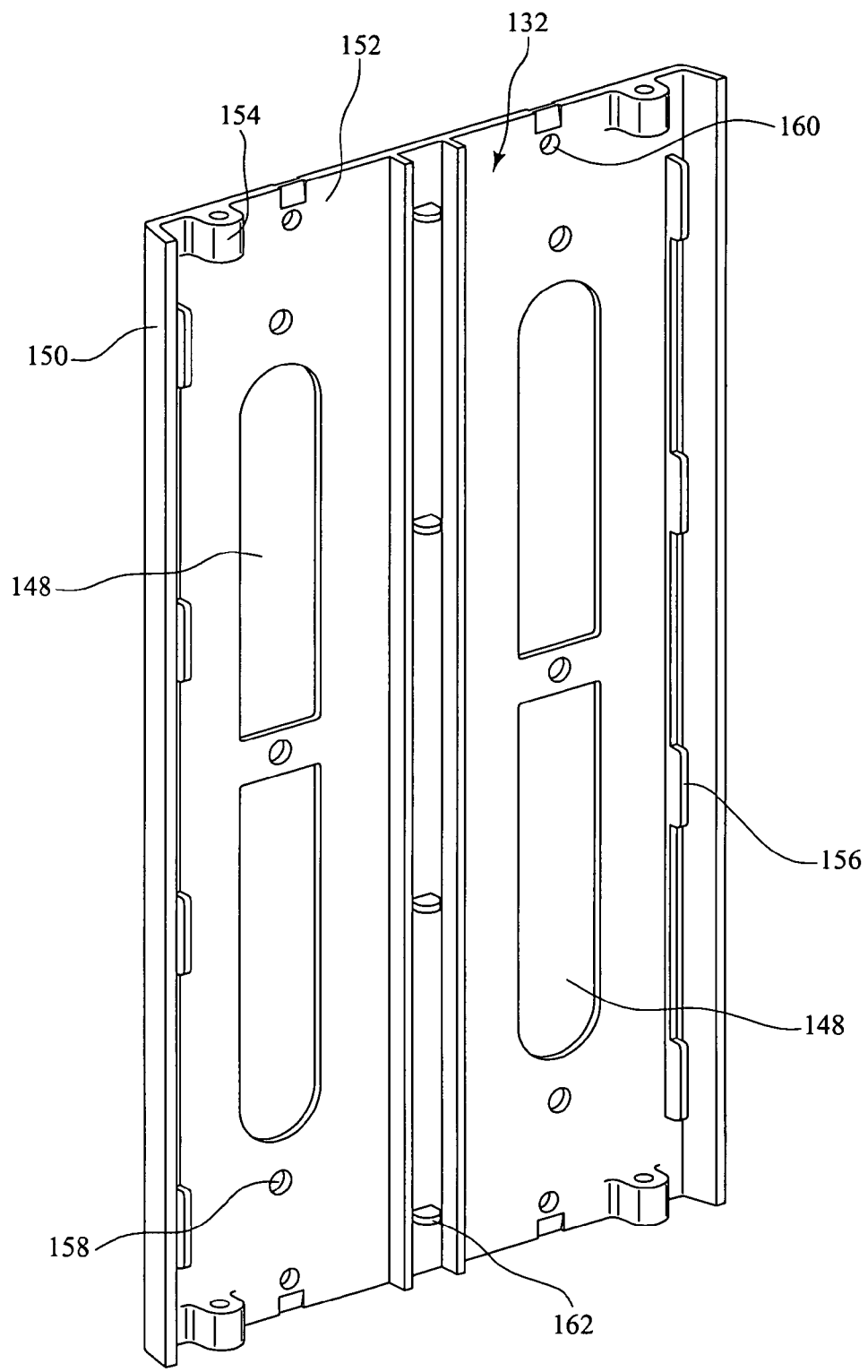
FIG. 6 is a perspective view of a non-sealing side end plate of the filter cassette of FIG. 1 showing the interlocking structure and media fill apertures.

FIG. 6 shows a non-sealing side end plate 132 having an interlocking structure and media fill apertures 148. Rectangular end plate 132 is of a unitary design providing an end plate for two adjacent media containers 101 in a "V" configuration. End plate 132 is unitary and substantially planar and provides a double end plate for media screens 124 of proximate containers 101 joined thereon with proximate media screens 101 being adjacent thereon and retained with raised snap retainer 162. Snap retainers 156 depend from inner surface 152 and provide a means for retaining media screens 124 adjacent depending edge 150. Fastener holes 158 provide a means for fastening fill caps 128 thereon. Preferably rivets will be used to fasten fill caps 128 to end plates 132. Female fill cap guides 160 receive guide posts 168 (shown in FIG. 7) extending form fill caps 128 aligning fill caps 128 over fill apertures 148. Female retainers 154 engage retaining posts 138 on side panel 102.

Figure 7:
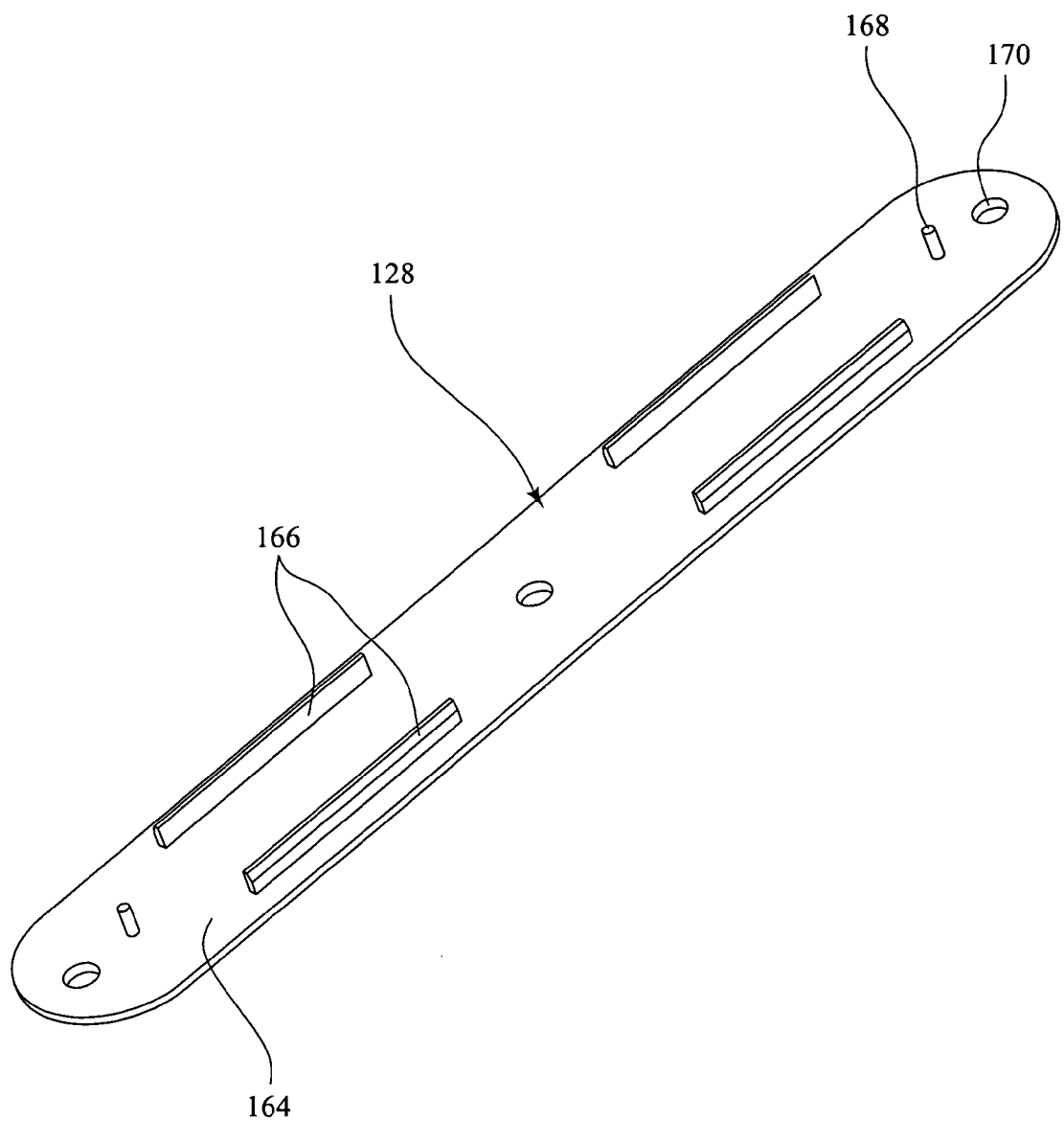
FIG. 7 is a perspective view of a fill cap of the filter cassette of FIG. 1 showing the interlocking structure attachment means.
Figure 8:
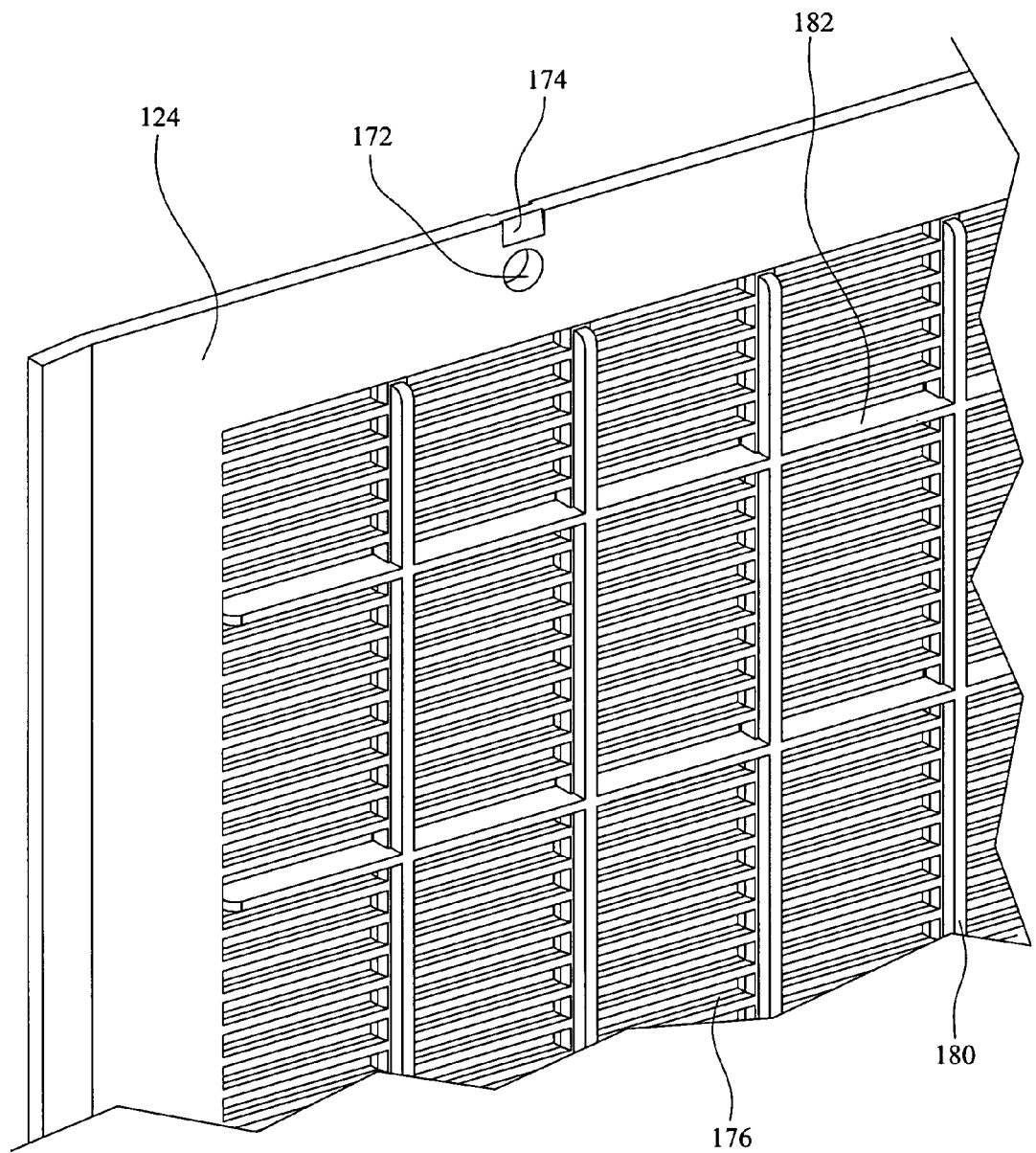
FIG. 8 is a perspective cut-away view of a media screen of the filter cassette of FIG. 1 showing support ribs.

FIG. 7 shows fill cap 128 with an interlocking structure and attachment means. Raised guides 166 depend from inner surface 164 and engage side edges of fill apertures 148 in end plates 132. Preferably rivets will be used to fasten fill caps 128 to end plates 132 through fastening holes 170. Female fill cap guides 160 on end plate 132 receive guide posts 168 depending form fill cap 128 aligning fill cap 128 over fill a media fill aperture 148. FIG. 8 shows a cut-away view of media screen 124 having support ribs 182 and 180. Horizontal support ribs 182 and vertical support ribs 180 are optional with the incorporation of such depending on factors such as the flow rate and density of the gas passing there through as well as the material of construction of media screen 124. Support ribs 180 and 182 may be spaced as needed and have a depth as desired to reduce a bowing effect on media screens 124 and increase the ability of said media screens to resist deformation upon the application of pressure thereon. Supports 180 and 182 are integral with media screens 124 between selected rows and columns of apertures 176. Media screens 124 have apertures 176 sized and configured to optimize media retention within and fluid flow there through. Also shown here are gas apertures 176 having an optional tapered inlet. The gas inlet side of apertures 176 has a larger area than the gas outlet side providing for improved fluid flow there through and thus reducing a pressure drop there across. Also shown here are the snap assembly features 172 and 174. Notch 174 and whole 172 engage raised media screen snap retainers 136 on side panels 102.

Figure 9:
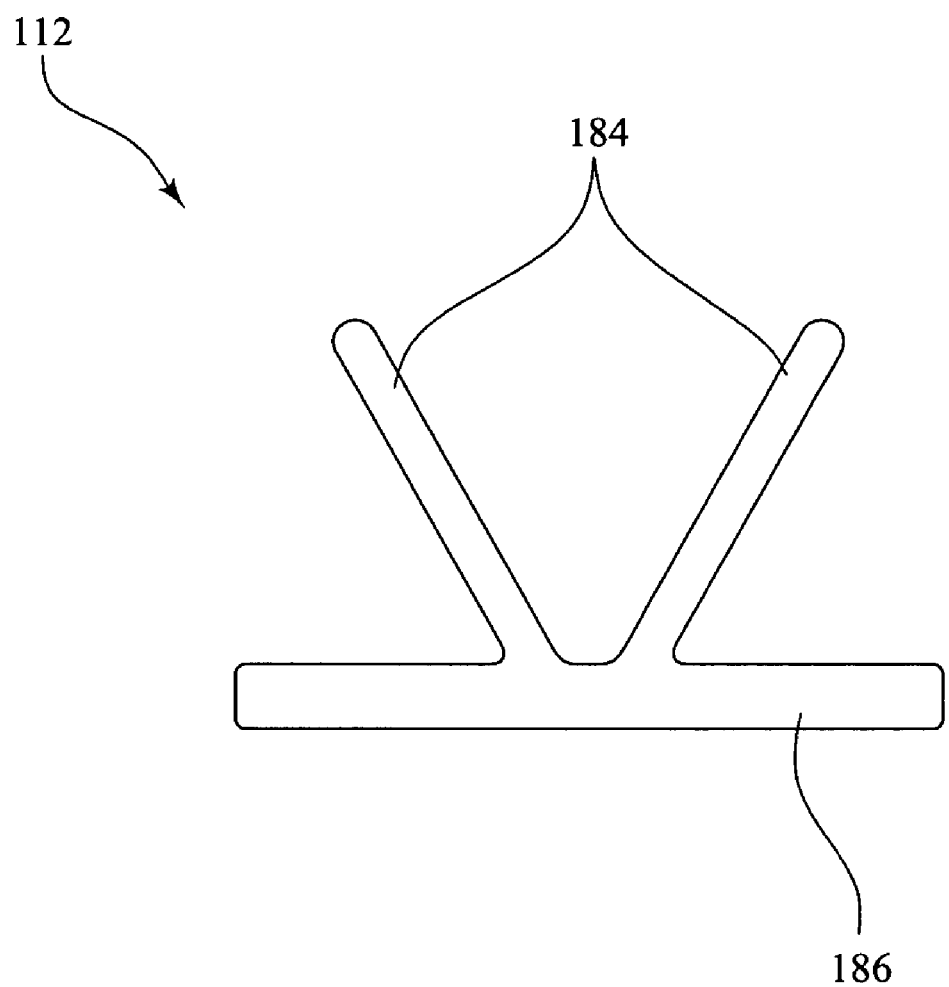
FIG. 9 is a cross-sectional view of a butterfly seal shown on the filter cassette of FIG. 1.

FIG. 9 shows a cross-sectional view of a distinctive profile butterfly seal or gasket 112 of the present invention. Distinctive profile gasket or butterfly gasket 112 is in strip form and has two longitudinally extending flaps 184 in a "V" configuration depending from strip 184. Butterfly gasket 112 sealing engages flat surfaces as well as rounded surfaces. It is anticipated that butterfly gasket 112 will engage rounded gaskets in filter housings or racks forming a seal there between.

Figure 10:
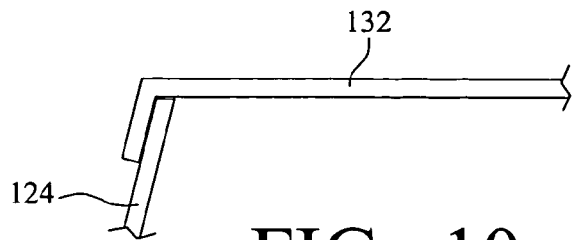
FIG. 10 shows a matingly relationship between end plates and media screens.
Figure 10A:
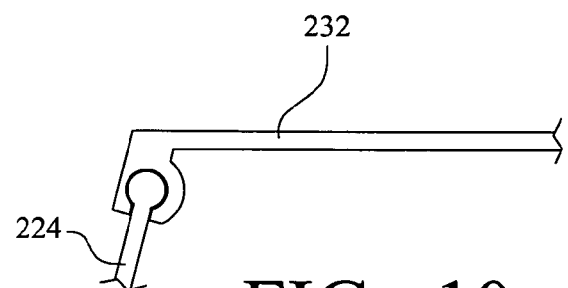
FIG. 10a shows an alternative embodiment of a matingly relationship between end plates and media screens.
Figure 10B:
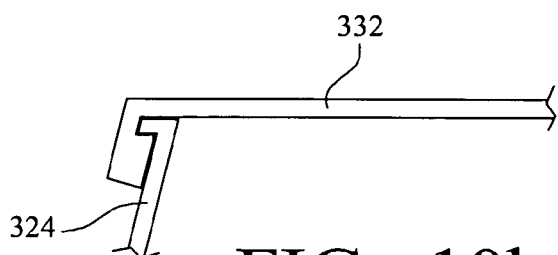
FIG. 10b shows yet another alternative embodiment of a matingly relationship between end plates and media screens.

FIGS. 10, 10a, and 10b show matingly relationships between end plates and media screens. End plate 132 has a depending side edge engaging an outer surface of media screen 124. End plate 232 has a depending ball socket engaging a ball joint extending the edge of media filter 224. End plate 332 has a depending side edge with a notch therein receiving a lip extending outward from media screen 324. These matingly relationships serve as examples of the interlocking feature of the present invention.

Figure 11:
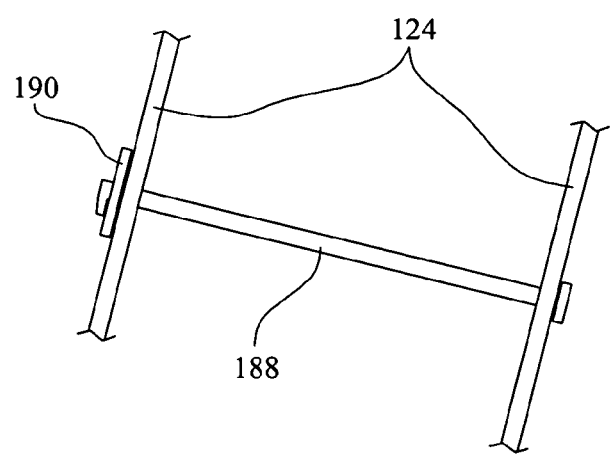
FIG. 11 shows an embodiment of a support extending between a pair of opposing rectangular media screens.

FIG. 11 shows an embodiment of support 118 extending between a pair of opposing rectangular media screens 124. Support 118 is a cross brace extending between said pair of opposing rectangular media screens 124 and has a head at one end engaging the outer surface of an aperture 176 in media screen 124 and a clip retainer 190 on an opposite end engaging the other media screen 124. Support 118 is optional and may be used in conjunction with horizontal support ribs 182 and/or vertical support ribs 180 to provide additional resistance against a bowing effect.

Figure 12:
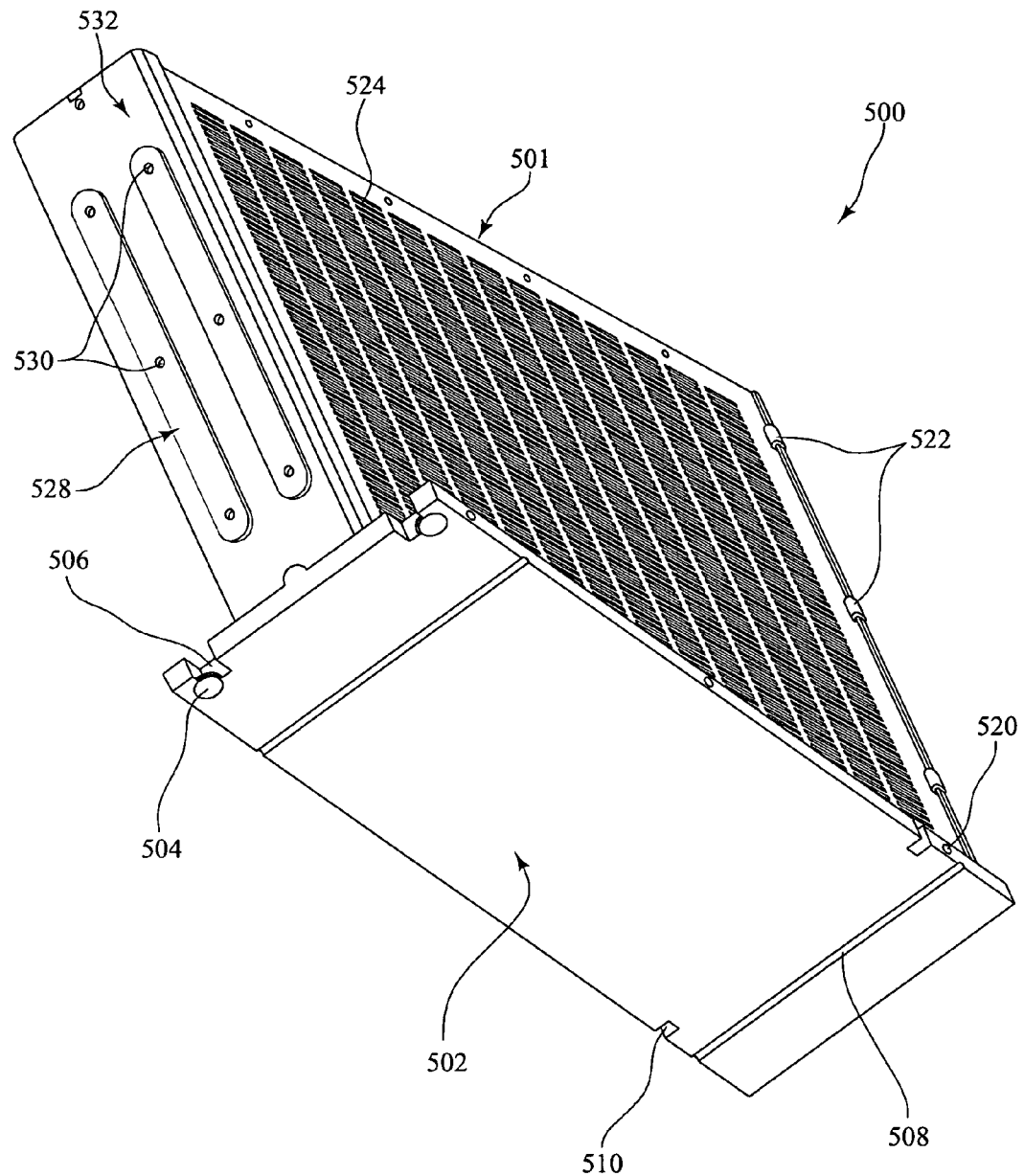
FIG. 12 is a perspective view of an alternative embodiment of a filter cassette of the present invention showing a non-sealing side.

FIG. 12 shows an alternative embodiment of a filter cassette of the present invention. Filter cassette 500 has rectangular side panels 502 with a pair of filter media containers 501 extending there between. Each filter media container 501 is formed with opposing rectangular end plates 514 (shown in FIG. 16) and 532 and a pair of opposing rectangular media screens 524. Shown here is rectangular end plate 532 having a unitary design providing an end plate for both filter media containers 501. Adjacent end plates of filter media containers are unitary and substantially planar in the form of a unitary double end plate 532 where media screens 524 of proximate containers 501 joined thereon with proximate media screens 501 being adjacent thereon. Unitary double end plate 532 provides each filter media container 501 with a media fill aperture, shown enclosed with a fill caps 528 here, on the non-sealing side of filter cassette 500. Fill caps 528 are retained to end plate 532 with fasteners 530. Friction reducers 522 on outer edges of end plates 114 are optional. Guide notches 510 in the side edges of side panels 502 are in the sides other than the sealing and non-sealing sides having end plates 514 and 532 respectively. Guide notches 510 are more proximate a sealing side than the non-sealing side of cassette 500 and are substantially equidistant from the sealing side. Side panels 502 optionally have at least one gasket locator line 508 therein in strip form extending between the outer edges of side panels 502 substantially parallel the sealing surface of cassette 500. Preferably, a gasket such as a compression gasket is in each gasket locator line 508. Optionally, rectangular side panels 502 each have at least one friction reducer 520 in the sides other than the sealing and said non-sealing sides. Side panel 502 optionally has finger holes 504 proximate corners adjacent the non-sealing side of cassette 500 and notches 506 in side panels 502 where notches 506 are proximate and circumscribe a portion of finger holes 504.

Figure 13:
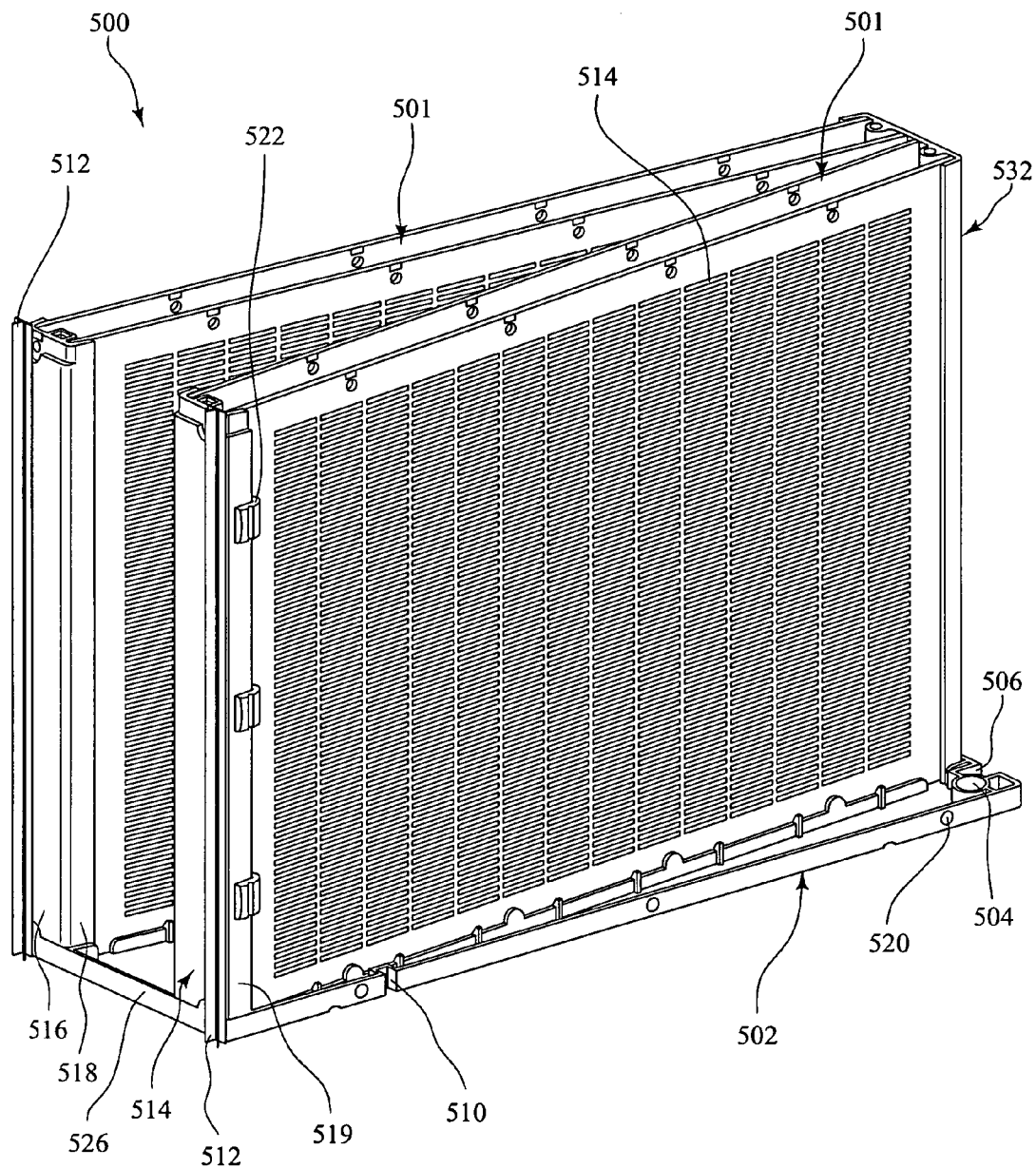
FIG. 13 is a perspective view of the filter cassette of FIG. 12 showing the sealing side.

FIG. 13 shows the sealing side of filter cassette 500. The sealing side of filter cassette 500 is substantially smooth, flat and substantially uniform surface and is formed with end plates 514 and sealing edges 526 of side panels 502. End plates 514 and side panel edges 526 optionally have seal 512 extending between the outer edges of side panels 502 and are preferably substantially parallel and proximate the outer longitudinal edges of end plates 514. Seal 512 preferably will be a distinctive profile gasket such as a butterfly seal. Friction reducers 522 on outer edges 519 of end plates 514 are optional and are shown here in the form of a clip.

Figure 14:
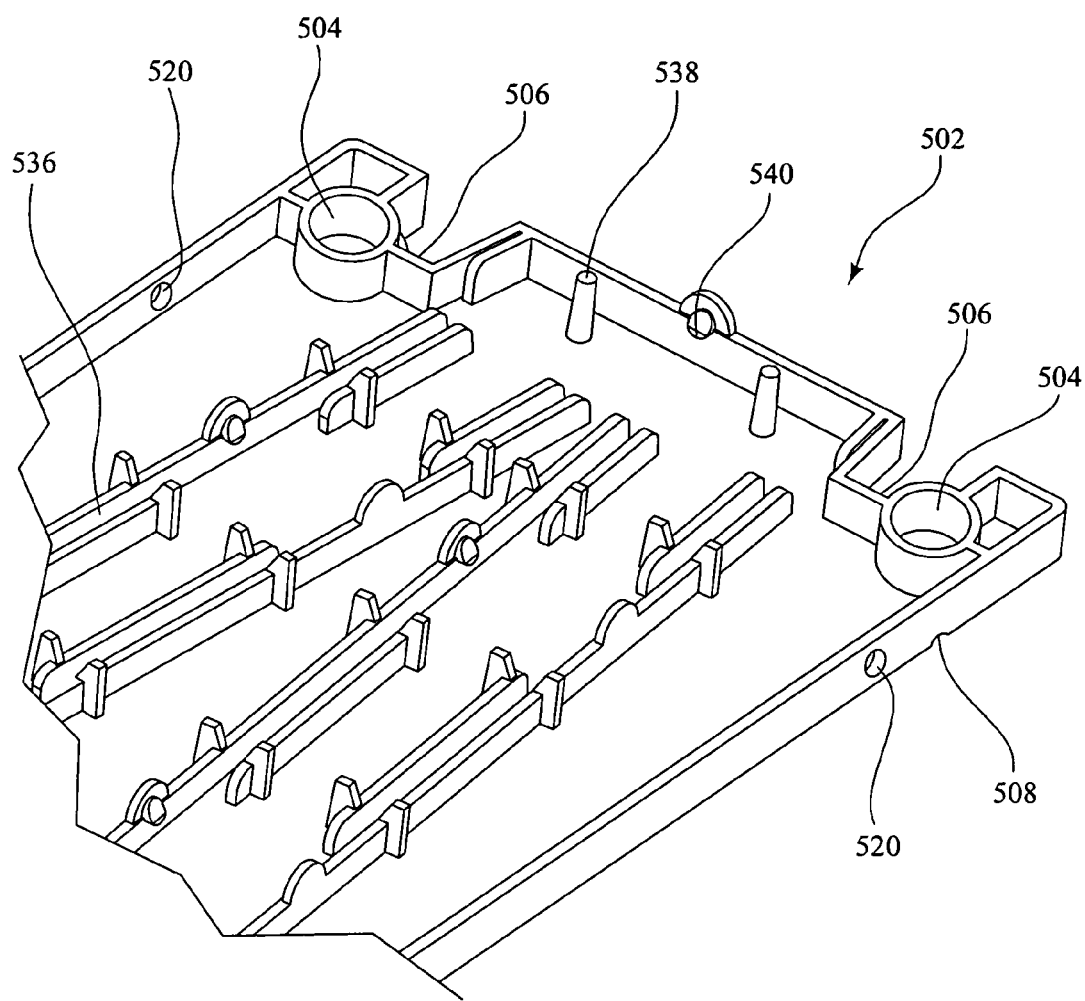
FIG. 14 is a cut-away perspective view of a side panel of the filter cassette of FIG. 12.

FIG. 14 shows the internal surface and side edges of side panels 502 of the filter cassette 500. The internal surface of side panels 502 have an interlocking structure with raised media screen snap retainers 536, guide posts 538 and dimples 540 for engaging end plates 514 and 532. Notches 106 in side panels 502 are shown proximate and circumscribing a portion of finger holes 504. Optional friction reducers 520 are shown in the sides other than the sealing and non-sealing sides of rectangular side panel 502.

Figure 15:
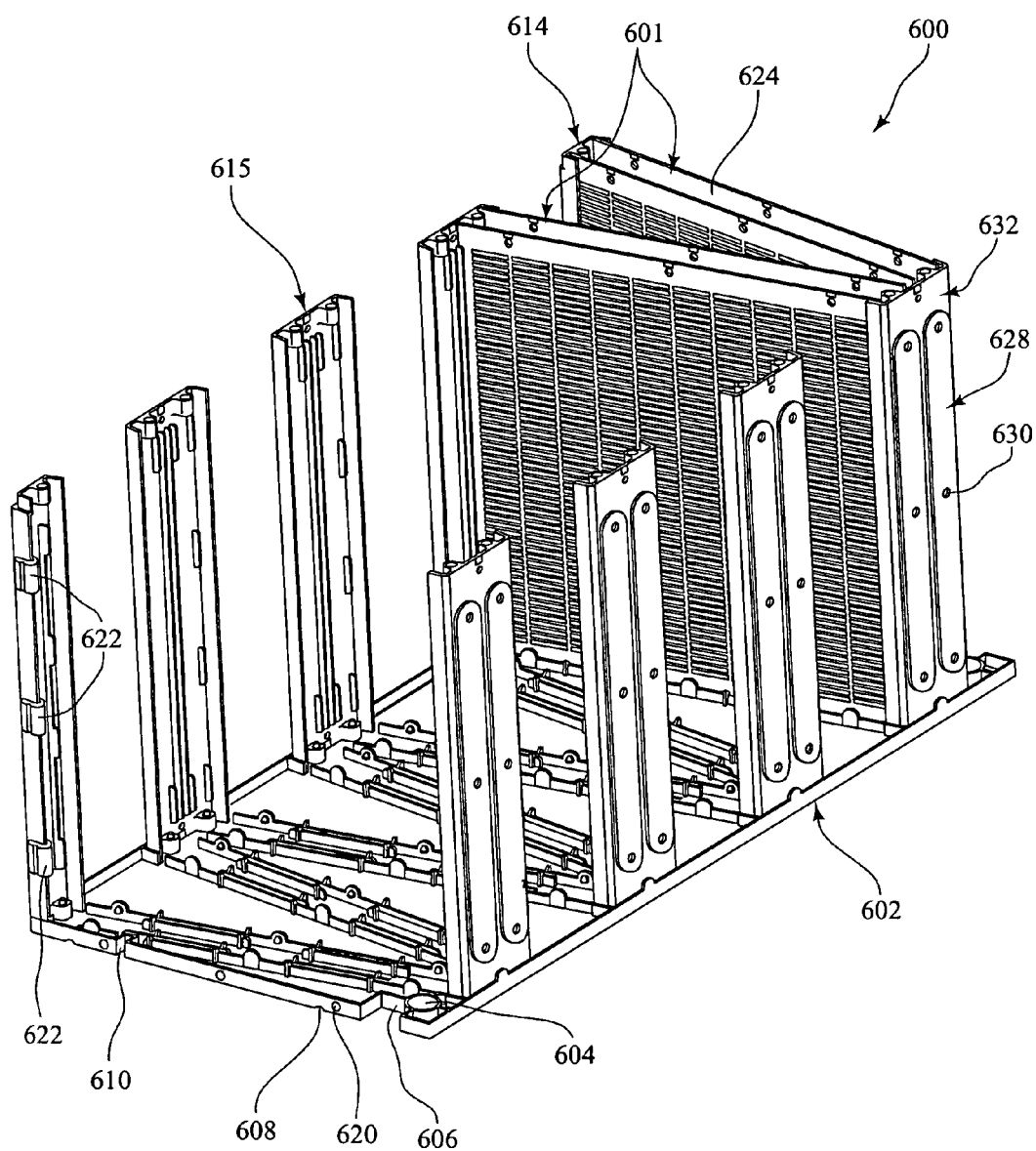
FIG. 15 is a perspective view of yet another embodiment of a filter cassette of the present invention having a plurality of pairs of filter media containers.

FIG. 15 is a perspective view of filter cassette 600 of the present invention providing a plurality of pairs of filter media containers 601. Filter cassette 600 has the means to have at least two pairs of filter media containers 601, shown here is a means to have four pairs of filter media containers with each pair being in a "V" configuration. FIG. 2 is a perspective view of the filter cassette 100 showing the non-sealing side and having a top side panel 602 removed. Shown here is rectangular end plate 132 having a unitary design providing an end plate for both filter media containers 101. Adjacent end plates of filter media containers are unitary and substantially planar in the form of a unitary double end plate 132 and media screens 124 of proximate containers 101 joined thereon with proximate media screens 101 being adjacent thereon. Unitary double end plate 632 provides each filter media container 601 with a media fill aperture, shown enclosed with a fill cap 628 here, on the non-sealing side of filter cassette. Fill caps 628 are attached to end plate 632 with fasteners 630. Also shown here is the internal snap together design between component parts forming filter cassette 600. Preferably, a gasket such as a compression gasket is in each gasket locator line 608. Optionally, rectangular side panels 602 each have at least one friction reducer 620 in the sides other than the sealing and said non-sealing sides. In the embodiment shown, side panels 602 each have finger holes 604 proximate corners adjacent the non-sealing side of cassette 600 and notches 606 circumscribing a portion thereof providing for easier gripping of cassette 600. Media screens 624 are enclosed at opposite ends with end caps 614, 614, and 632. Friction reducers 622 on outer edges of end plates 614 are optional and are shown here in the form of a clip. Guide notches 610 in the side edges of side panels 602 are in the sides other than the sealing and non-sealing sides.

Figure 16:
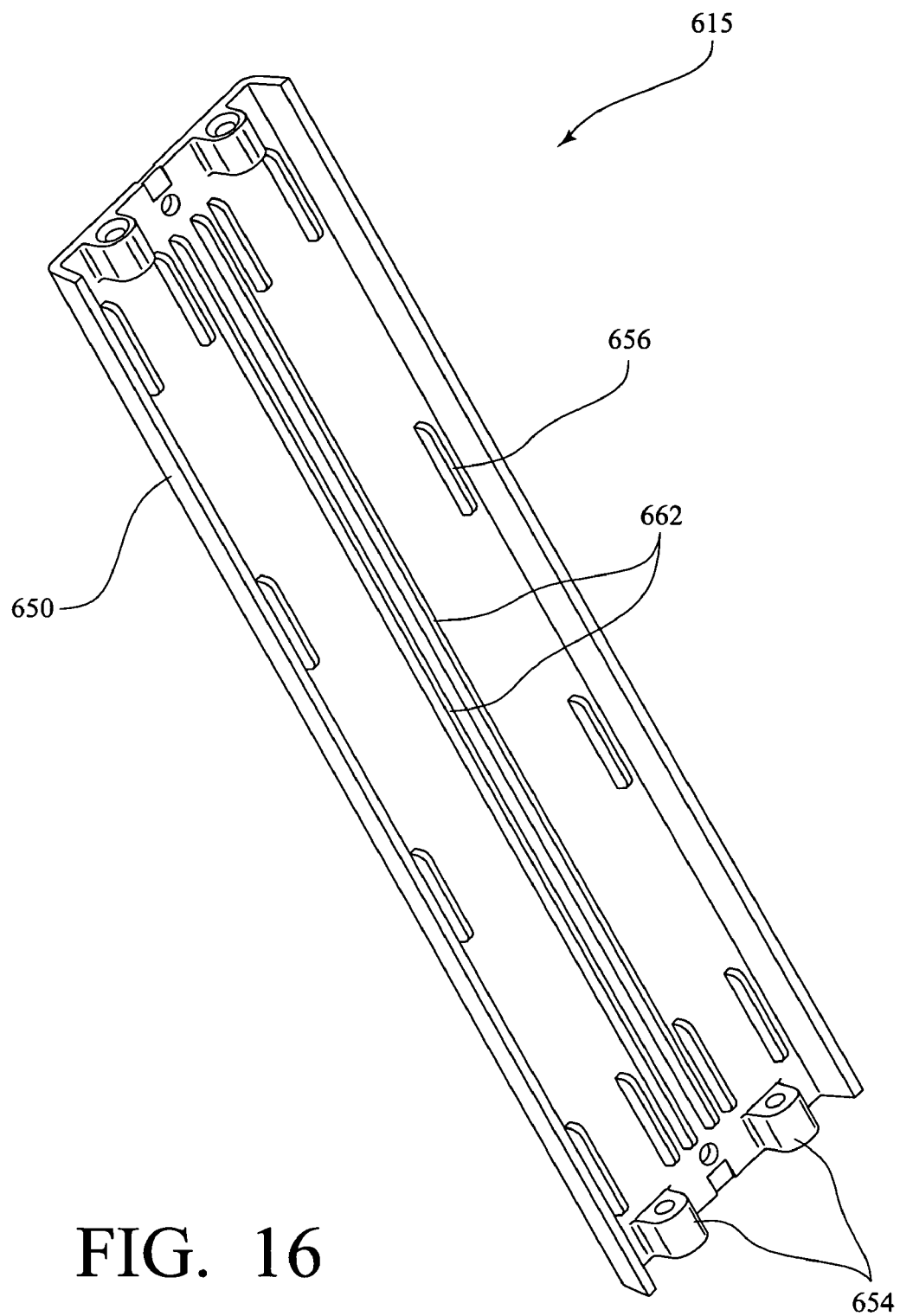
FIG. 16 is a perspective view of a sealing side double end plate of the filter cassette of FIG. 15.

FIG. 16 shows sealing side double end plate 615 of the filter cassette 600. Rectangular end plates 615 are of a unitary design providing an end plate for two adjacent media containers 601 in a "V" configuration. End plate 615 is unitary and substantially planar and provides a double end plate for media screens 624 of proximate containers 601 joined thereon with proximate media screens 601 being adjacent thereon and retained with raised snap retainer 662. Snap retainers 656 depend from an inner surface and provide a means for retaining media screens 624 adjacent depending edge 650. Female retainers 654 engage retaining posts on side panel 602.

Figure 17:
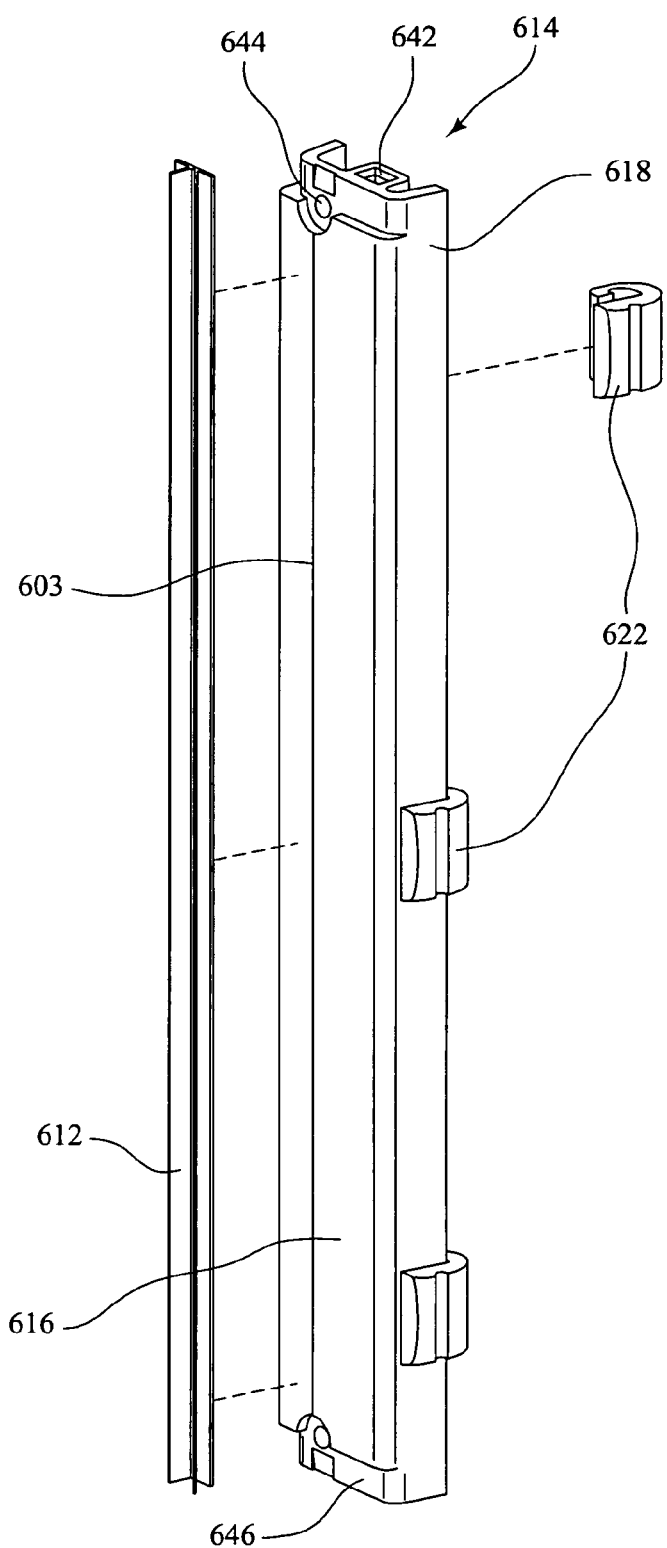
FIG. 17 is a perspective view of an outermost sealing side end plate of the filter cassette of FIG. 15.

FIG. 17 shows outermost sealing side end plate 614 of the filter cassette of 600. Friction reducers 622 on outer edges 618 of end plates 614 are shown as clips engaging side edges 618. Holes 644 engage dimples on side panels 602 while female retainers 642 engage retaining posts on side panels 602, providing interlocking between side panels 602 and end plates 614. End plate 614 has rounded outer longitudinal corners and a recessed outer surface 646 adjacent longitudinal ends. Recessed outer surface 646 provides for a smooth outer surface with side panels 602 forming a sealing surface. Seal location indentation 603 is optional and may have a seal 612 inserted therein on front face 616 of end plate 614. Seal 612 is preferably a distinctive profile gasket such as a butterfly seal.

The present invention provides a filter cassette with at least one pair of media containers in a "V" configuration. Each media container is formed by a pair of opposed media screens and a pair of opposed end plates extending between a pair of opposed side panels. One of the end plates in each media containers has a fill aperture enclosed with a removable fill cap for filling each media container with filtration media. The filter cassettes of the present invention may be of a variety of sizes and have a variety of pairs of media containers in a "V" configuration.

We claim:

1. A filter cassette having a semi-rigid structure comprising:
   a first and second rectangular side panel;
   at least one pair of filter media containers
   wherein each of said filter media containers has opposing first and second end plates;
   each of said filter media containers also having a pair of opposing rectangular media screens extending between said first and said second side panels,
   said at least one pair of containers in a "V" configuration and having adjacent said first end plates, one of said at least one said adjacent first end plates having a media fill aperture located on a non-sealing side of said filter cassette opposite a sealing side of said filter cassette,
   said second end plates on said sealing side of said cassette extending between corners of said first and said second side panels forming a substantially smooth sealing surface;
   a fill cap removeably attached to said one of said at least one adjacent first end plates thereby enclosing said media fill aperture;
   wherein said second outermost end plates and said first and second side panels have a seal location indentation with a seal between the outer edges of said first and second side panels substantially parallel and proximate outer longitudinal edges of said second outermost end plates to adequately seal said sealing side of said cassette.

2. The filter cassette of claim 1 wherein said seal is a butterfly seal having two longitudinally extending flaps in a "V" configuration.

3. The filter cassette of claim 1 wherein said seal is a gel seal.

4. The filter cassette of claim 1 wherein each of said outermost end plates have a portion extending from said sealing side toward said non-sealing side of said filter cassette, said extending portions of said outermost end plates have at least one friction reducer attached thereon.

5. The filter cassette of claim 4 wherein each of said friction reducers has a groove in an outer surface substantially perpendicular said first and second rectangular side panels.

6. The filter cassette of claim 1 wherein said first and second rectangular side panels each have notches in the sides other than said sealing and said non-sealing sides, said notches being more proximate said sealing side than said non-sealing side and substantially equidistant from said sealing side.

7. The filter cassette of claim 1 wherein said first and second rectangular side panels have substantially smooth solid outer surfaces.

8. The filter cassette of claim 7 wherein said first and second rectangular side panels have at least one gasket locator indentation therein, said at least one gasket locator indentation is in strip form and extends substantially parallel said sealing surface.

9. The filter cassette of claim 8 wherein each of said at least one gasket locator indentation in said side panels has a gasket thereon.

10. The filter cassette of claim 9 wherein said gaskets are compression gaskets.

11. The filter cassette of claim 1 wherein said adjacent first end plates join to form a substantially planar double end plate and have said media screens of proximate containers joined thereon with proximate media screens being substantially adjacent thereon.

12. The filter cassette of claim 11 wherein said adjacent first end plates are of a unitary construction.

13. The filter cassette of claim 1 wherein said side panels have raised snap retainers holding said end plates and said media screens.

14. The filter cassette of claim 1 wherein said sealing side of said filter cassette has a flat substantially uniform surface formed by said outermost end plates and edges of said first and second rectangular side panels.

15. The filter cassette of claim 1 wherein said media screens have apertures sized and configured to optimize media retention within and fluid flow there through.

16. The filter cassette of claim 15 wherein said media screens on a gas inlet side of said containers have tapered apertures with the wider side of the aperture facing said gas inlet side.

17. The filter cassette of claim 1 wherein said media screens have supports increasing the ability of said media screens to resist deformation upon the application of pressure thereon.

18. The filter cassette of claim 17 wherein said supports are in the form of ribs integral with said media screens between selected rows and columns of said apertures.

19. The filter cassette of claim 17 wherein said supports are in the form of at least one cross brace extending between said pair of opposing rectangular media screens in each of said at least one pair of filter media containers.

20. The filter cassette of claim 1 wherein said first and second rectangular side panels each have at least one friction reducer in the sides other than said sealing and said non-sealing sides.

21. The filter cassette of claim 1 wherein said first and second rectangular side panels each have a finger hole proximate corners adjacent said non-sealing sides.

22. The filter cassette of claim 21 wherein said first and second rectangular side panels each have a notch therein proximate and circumscribing a portion of said finger holes.

23. The filter cassette of claim 1 wherein said first end plates have rounded outer longitudinal corners.

24. The filter cassette of claim 1 having at least two pairs of filter media containers.

25. A filter cassette having a snap assembly structure comprising:
two opposing side panels;
at least one pair of filter media containers in a "V" configuration wherein each of said filter media containers has a pair of opposing end plates and a pair of opposing media screens extending between said two opposing side panels,
each of said at least one pair of containers in a "V" configuration and having adjacent end plates, one of said at least one adjacent end plates in said at least one pair of containers having a media fill aperture located on a non-sealing side of said filter cassette opposite a sealing side of said filter cassette,
said outermost end plates on said sealing side of said cassette extend between corners of said two opposing side panels forming a substantially smooth sealing surface on said sealing side;
a fill cap attached to said one of said at least one adjacent end plates enclosing said media fill aperture;
wherein said outermost end plates and said first and second side panels having a seal location indentation with a seal between the outer edges of said first and second side panels substantially parallel and proximate outer longitudinal edges of said outermost end plates to adequately seal said sealing side of said cassette.

26. A filter cassette comprising:
at least two media containers in a "V" configuration,
each of said media containers having a pair of opposed media screens and a pair of opposed end plates extending between a pair of opposed side panels forming a rectangular media container;
wherein at least one of said opposed end plates of one of said containers being adjacent one of said end plates of a proximate container forming a "V" configuration between proximate media screens of said proximate containers,
one of said pair of opposed end plates in each of said media containers having at least one media fill aperture for filling each of said containers with filtration media,
said at least one fill aperture having a fill cap overlaying said fill aperture,
said fill cap being removeably attached to said end plate;
wherein said end plates opposing said adjacent end plates and said opposed side panels having a seal location indentation with a seal between the outer edges of said side panels substantially parallel and proximate outer longitudinal edges of said end plates opposing said adjacent end plates to adequately seal said cassette.

* * * * *

UNITED STATES PATENT AND TRADEMARK OFFICE
CERTIFICATE OF CORRECTION

PATENT NO.       : 7,588,629 B2                                          Page 1 of 1
APPLICATION NO.  : 11/336105
DATED            : September 15, 2009
INVENTOR(S)      : Osborne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 718 days.

Signed and Sealed this

Twenty-first Day of September, 2010

David J. Kappos
*Director of the United States Patent and Trademark Office*